United States Patent

Morimitsu et al.

Patent Number: 5,116,959
Date of Patent: May 26, 1992

[54] FIBER-REACTIVE MONOAZO DYE COMPOUNDS HAVING SUBSTITUTED TRIAZINYL BRIDGING GROUP

[75] Inventors: Toshihiko Morimitsu, Minoo; Naoki Harada, Suita; Takashi Omura, Ashiya; Sadanobu Kikkawa, Minoo, all of Japan

[73] Assignee: Sumitomo Chemical Company, Limited, Osaka, Japan

[21] Appl. No.: 23,563

[22] Filed: Mar. 9, 1987

[30] Foreign Application Priority Data

Mar. 13, 1986 [JP] Japan .................. 61-55696
Apr. 30, 1986 [JP] Japan .................. 61-101330
Sep. 19, 1986 [JP] Japan .................. 61-223454
Sep. 22, 1986 [JP] Japan .................. 61-224645

[51] Int. Cl.$^5$ .................. C09B 62/51; D06P 1/384
[52] U.S. Cl. .................. 534/642; 534/638
[58] Field of Search .............. 534/617, 642, 803, 638

[56] References Cited

U.S. PATENT DOCUMENTS

| | | |
|---|---|---|
| 3,110,710 | 11/1963 | Rattee et al. .................. 534/803 |
| 3,177,214 | 4/1965 | Sulzer et al. .................. 534/803 X |
| 3,658,783 | 4/1972 | Knobloch et al. .................. 534/803 |
| 4,341,699 | 7/1982 | Tezuka et al. .................. 534/638 |
| 4,412,948 | 11/1983 | Omura et al. .................. 534/637 |
| 4,686,286 | 8/1987 | Niwa et al. .................. 534/637 |

FOREIGN PATENT DOCUMENTS

| | | | |
|---|---|---|---|
| 0203567 | 12/1986 | European Pat. Off. .......... 534/634 |
| 40-017113 | 8/1965 | Japan .................. 534/638 |
| 59-179665 | 10/1984 | Japan .................. 534/638 |
| 60-260654 | 12/1985 | Japan .................. 534/638 |

Primary Examiner—Patricia L. Morris
Assistant Examiner—Fiona T. Powers
Attorney, Agent, or Firm—Stevens, Davis, Miller & Mosher

[57] ABSTRACT

A monoazo compound represented by the following formula in a free acid form,

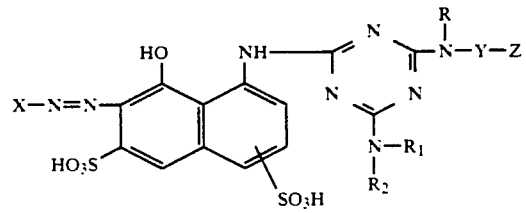

wherein R is hydrogen or unsubstituted or substituted $C_1$ to $C_4$ alkyl, X is unsubstituted or substituted phentyl or naphthyl, Y is unsubstituted or substituted phenylene or naphthylene, Z is $-SO_2CH=CH_2$ or $-SO_2CH_2CH_2Z_1$, in which $Z_1$ is a splittable group by the action of an alkali, and $R_1$ and $R_2$ are independently hydrogen or unsubstituted or substituted $C_1$ to $C_4$ alkyl, phenyl or benzyl, excepting the case where $R_1$ and $R_2$ are hydrogen, which is useful as reactive dyes of high solubility and good build-up property for giving dyed or printed products of a deep red color excellent in fastness properties.

8 Claims, No Drawings

FIBER-REACTIVE MONOAZO DYE COMPOUNDS HAVING SUBSTITUTED TRIAZINYL BRIDGING GROUP

The present invention relates to a monoazo compound, a process for producing the same and a process for dyeing or printing fiber materials using the same. More specifically, the present invention relates to a monoazo compound having a vinylsulfone type fiber reactive group through a substituted triazinyl bridging group, which is useful for dyeing or printing fiber materials in a red color.

Many fiber reactive monoazo dyes useful for dyeing or printing fiber materials in a red color are known. For example, fiber reactive monoazo dyes represented by the following formulas in each free acid form,

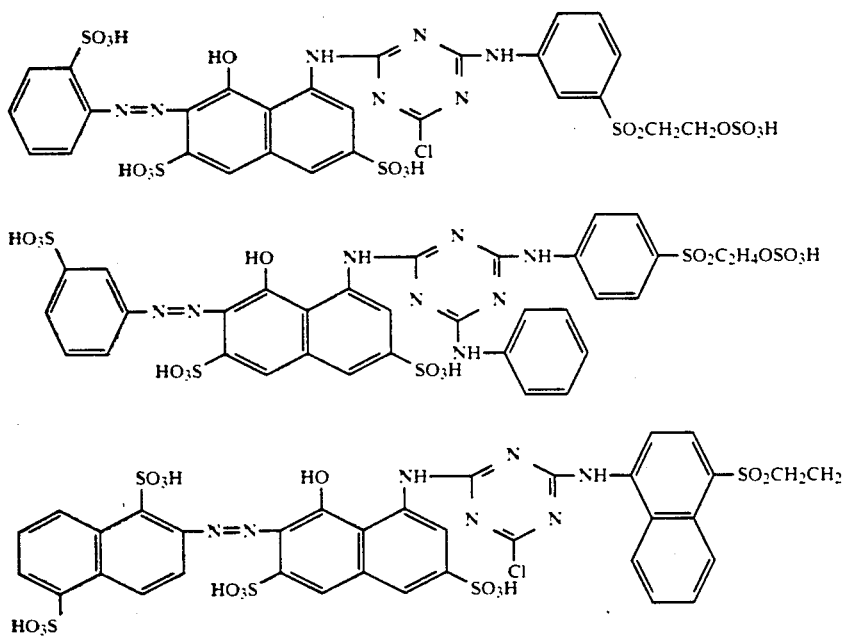

are disclosed in U.S. Pat. No. 3223470, Published Examined Japanese Patent Application No. 824/1971 and Published Examined Japanese Patent Application No. 39672/1980, respectively. However, these known dyes are still waiting for improvement with respect to dye performances such as solubility and build-up property as well as fastness properties of dyed or printed fiber products.

It is natural that the solubility is a significant property required for the reactive dye on carrying out the dyeing or printing of fiber materials without any difficulty, as already known, for example, in a dictionary of dyes and dyeing, edited by K. G. Ponting, page 159 (1980). Moreover, dyeing and printing systems in a dye house have been actively mechanized and automated in many aspects for saving energy and labor, and therefore the reactive dyes have been eagerly required to be formed into an aqueous liquid composition for automatic weighing and dispensing systems. Also for this reason, the solubility of the reactive dye is significant.

While, in general speaking, a reactive dye having a high solubility decreases its affinity to fibers, and is easy to hydrolyze its fiber reactive group, resulting in decrease of its build-up property. Therefore, it is considered that the solubility of the reactive dye can be improved with detriment to the buildup property and vice versa.

Nevertheless, the reactive dyes have been required to be improved in the solubility and build-up property at the same time and in a high degree.

The present inventors have undertaken extensive studies to find a monoazo compound meeting needs described above and having other dye properties widely required, and as a result found that the object can be accomplished by providing a monoazo compound having a specific chromophore and a so-called vinylsulfone type fiber reactive group through a specific substituted triazinyl bridging group.

The present invention provides a monoazo compound represented by the following formula (I) in a free acid form,

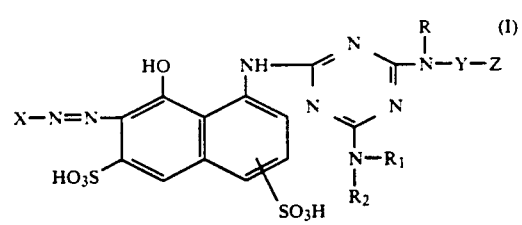

wherein R is hydrogen or $C_1$ to $C_4$ alkyl unsubstituted or substituted with 1 or 2 members selected from hydroxy, cyano, $C_1$ to $C_4$ alkoxy, halogeno, carboxy, carbamoyl, $C_1$ to $C_4$ alkoxycarbonyl, $C_1$ to $C_4$ alkylcarbonyloxy, sulfo and sulfamoyl; X is phenyl unsubstituted or substituted with 1 to 3 members selected from methyl, ethyl, methoxy, ethoxy, halogeno, acylamino, nitro, sulfo and carboxy, or mono-, di- or tri-sulfonaphthyl; Y is phenylene unsubstituted or substituted with 1 or 2 members selected from methyl, ethyl, methoxy, ethoxy, chloro, bromo and sulfo, or unsubstituted or mono-sulfonaphthylene; Z is $-SO_2CH=CH_2$ or $-SO_2CH_2CH_2Z_1$ in which $Z_1$ is a splittable group by the action of an alkali; and $R_1$ and $R_2$ are independently hydrogen, C₁ to C₄ alkyl, phenyl, naphthyl or benzyl, excepting the case where both $R_1$ and $R_2$ are hydrogen, the alkyl having 1 to 4 carbon atoms and being unsubstituted or substituted with hydroxy, cyano, $C_1-C_4$ alkoxy, amino, halogeno, carboxy, $C_1$ to $C_4$ alkoxycarbonyl, $C_1$ to $C_4$ alkylcarbonyloxy, carbamoyl, sulfamoyl, sulfo or sulfato, the phenyl being represented by the formula,

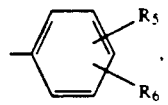

in which $R_5$ and $R_6$ are independently hydrogen, halogeno, $C_1$ to $C_4$ alkyl, $C_1$ to $C_4$ alkoxy, hydroxy, nitro, carboxy or sulfo, the naphthyl being represented by the formula,

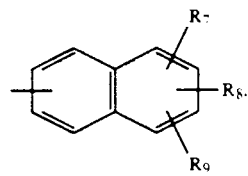

in which $R_7$, $R_8$ and $R_9$ are independently hydrogen, hydroxy or sulfo, and the benzyl being represented by the formula,

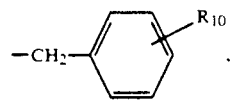

in which $R_{10}$ is hydrogen, methyl, methoxy or chloro; with the proviso that
 (a) Y is the phenylene when X is the phenyl,
 (b) Y is the naphthylene when X is the naphthyl, and
 (c)
  (1) $R_1$ is hydrogen and $R_2$ is chlorophenyl, or
  (2) $R_1$ is hydrogen and $R_2$ is the naphthyl excepting sulfonaphthyl, or
  (3) $R_1$ is the alkyl excepting methyl and the sulfoalkyl and $R_2$ is the phenyl excepting sulfophenyl,
when R is hydrogen and X and Y are the phenyl and the phenylene, respectively, and a process for producing the monoazo compound of the formula (I), which comprises (a) subjecting any one of a monoazo chromophore compound represented by the following formula (II) in a free acid form,

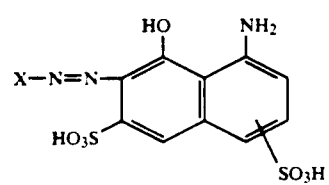

wherein X is as defined above, an aromatic amine compound represented by the following formula (III),

wherein R, Y and Z are as defined above, or an amine compound represented by the following formula (IV),

wherein $R_1$ and $R_2$ are as defined above, to first condensation reaction with a cyanuric halide followed by second and third condensation reactions with the remaining ones, or (b) subjecting any one of a naphthalenedisulfonic acid represented by the following formula (V) in a free acid form,

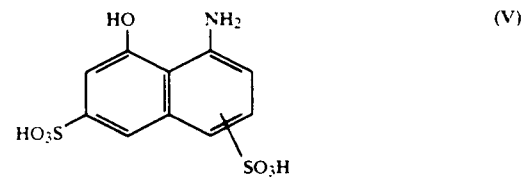

the aromatic amine of the formula (III) and the amine of the formula (IV) to first condensation reaction with a cyanuric halide, followed by second and third condensation reactions with the remaining ones and then coupling the resulting triazinyl compound represented by the following formula (VI) in a free acid form,

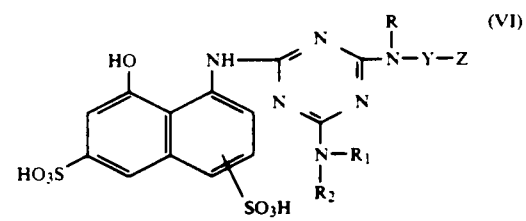

wherein R, $R_1$, $R_2$, Y and Z are as defined above, with a diazonium salt of an amine compound represented by the following formula (VII),

wherein X is as defined above.

The present invention also provides a process for dyeing or printing fiber materials, which comprises using the monoazo compound of the formula (I).

Among the monoazo compounds of the formula (I), particularly preferred are those represented by the following formulas (I)-1 to (I)-5 in each free acid form;

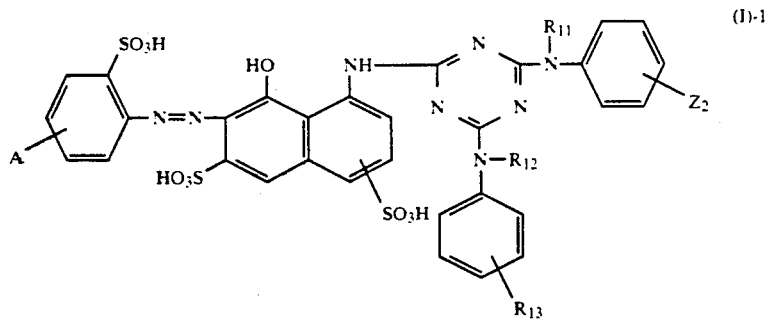
(I)-1 wherein A is hydrogen, methyl, methoxy or sulfo, $R_{11}$ is methyl or ethyl, $R_{12}$ is hydrogen, methyl or ethyl, $R_{13}$ is hydrogen, chloro, methyl, ethyl, methoxy, ethoxy, sulfo or carboxy, and $Z_2$ is $-SO_2CH=CH_2$ or $-SO_2CH_2CH_2OSO_3H$;

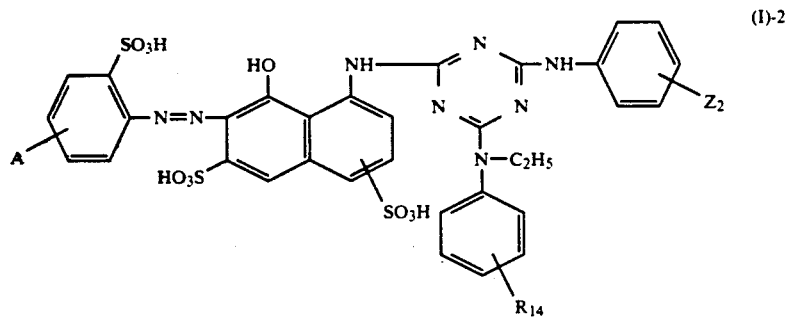
(I)-2 wherein A and $Z_2$ are as defined above, and $R_{14}$ is hydrogen, chloro, methyl, ethyl, methoxy or ethoxy;

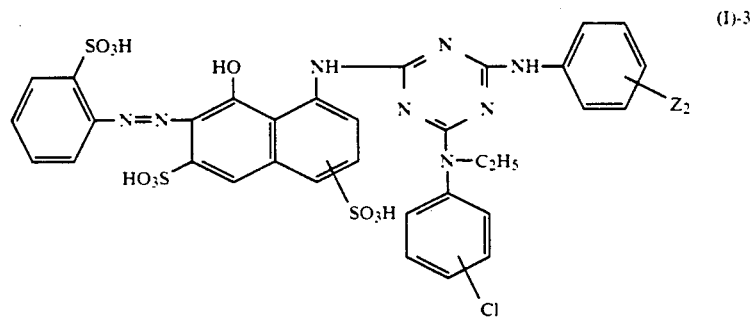
(I)-3 where $Z_2$ is as defined above;

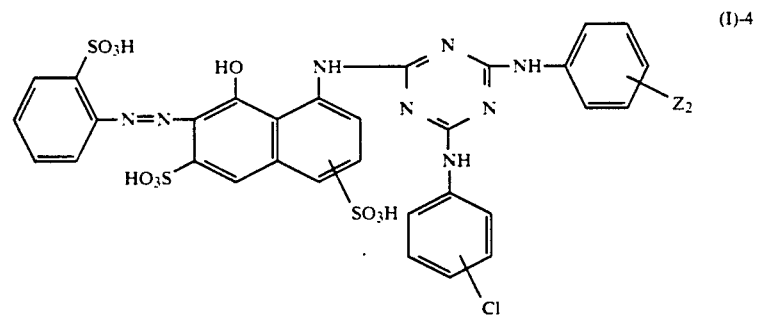
(I)-4 wherein $Z_2$ is as defined above; and

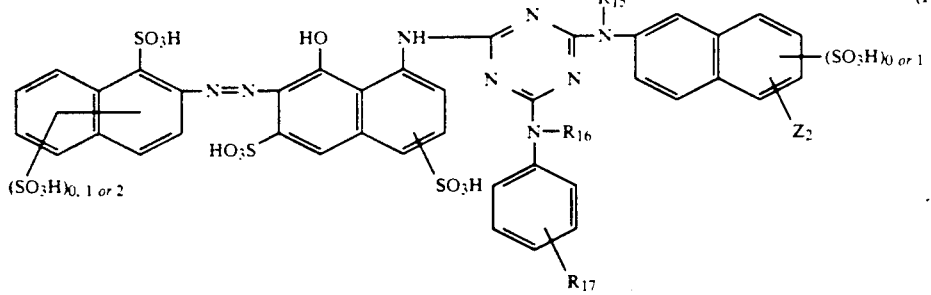

(I)-5 wherein $R_{15}$ and $R_{16}$ are independently hydrogen, methyl or ethyl, $R_{17}$ is hydrogen, chloro, methyl, ethyl, methoxy, ethoxy, sulfo or carboxy, and $Z_2$ is as defined above.

In the formula (I), examples of R are hydrogen, methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like. Of these, preferred are hydrogen, methyl and ethyl.

With respect to the phenyl represented by X, the acylamino include acetylamino and propionylamino, and the halogen includes chlorine and bromine. Preferred phenyl are o-sulfophenyl which may be further substituted with methyl, methoxy or sulfo.

With respect to the naphthyl represented by X, particularly preferred naphthyl is represented by the formula,

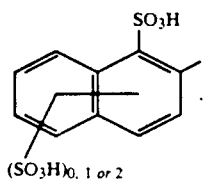

Examples of the phenylene and the naphtylene represented by Y are as follows:

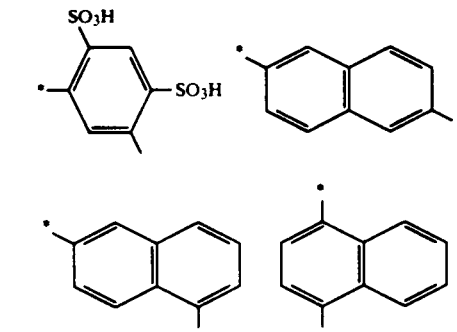

-continued

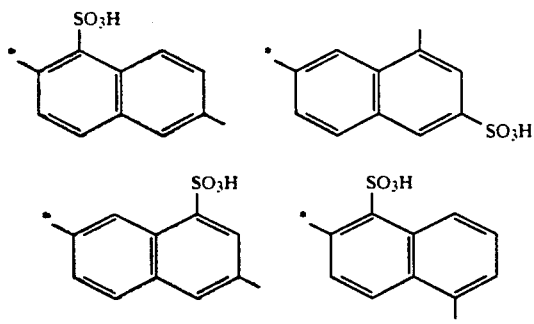

(In the above formulas, the asterisked linkage is bonded to the group,

Examples of the splittable group represented by $Z_1$ are —Cl, —OSO$_3$H, —SSO$_3$H, —OPO$_3$H$_2$ and —OCOCH$_3$, and preferred Z are —SO$_2$CH=CH$_2$ and —SO$_2$CH$_2$CH$_2$OSO$_3$H.

Examples of the alkyl represented by $R_1$ and $R_2$ are methyl, ethyl, n-propyl, iso-propyl, n-butyl, isobutyl, sec-butyl, 2-hydroxyethyl, 2- or 3-hydroxypropyl, 2-, 3- or 4-hydroxybutyl, cyanomethyl, 2-cyanoethyl, methoxymethyl, ethoxymethyl, 2-methoxyethyl, 2-ethoxyethyl, chloromethyl, bromomethyl, 2-chloroethyl, 2-bromoethyl, carboxymethyl, 2-carboxyethyl, 1,2-dicarboxyethyl, carbamoylmethyl, 2-carbamoylethyl, methoxycarbonylmethyl, ethoxycarbonylmethyl, 2-methoxycarbonylethyl, 2-ethoxycarbonylethyl, methylcarbonyloxymethyl, ethylcarbonyloxymethyl, 2-methylcarbonyloxyethyl, 2-ethycarbonyloxyethyl, sulfamoylmethyl, 2-sulfamoylethyl, 2-acetylaminoethyl, 3-dimethylaminopropyl, sulfomethyl, 2-sulfoethyl, 3-sulfopropyl, 4-sulfobutyl, 2-sulfatoethyl and the like. Of these, particularly preferred are methyl and ethyl.

Examples of the phenyl represented by $R_1$ and $R_2$ being independently represented by,

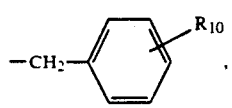

wherein $R_5$ and $R_6$ are as defined above, are phenyl, 2-, 3- or 4-chlorophenyl, 2-, 3- or 4-methylphenyl, 3,4- or 3,5-dimethylphenyl, 2-, 3- or 4-ethylphenyl, 2-, 3- or 4-methoxyphenyl, 2-, 3- or 4-ethoxyphenyl, 2-, 3- or 4-hydroxyphenyl, 3-nitrophenyl, 2-, 3- or 4-carboxyphenyl, 3,5-dicarboxyphenyl, 2-, 3- or 4-sulfophenyl, 3,5-disulfo, 2,5-disulfophenyl, 3-sulfo-4-hydroxyphenyl, 3-hydroxy-4-sulfophenyl, 3-sulfo-4-ethoxyphenyl and the like. Of these, particularly preferred are phenyl, 2-, 3- or 4-chlorophenyl, 2-, 3- or 4-sulfophenyl, and 2-, 3- or 4-methylphenyl.

Preferred examples of the naphthyl represented by $R_1$ and $R_2$ being independently represented

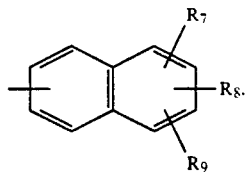

wherein $R_7$, $R_8$ and $R_9$ are as defined above, are mono-, di- or tri-sulfonaphthyl.

Preferred examples of the benzyl represented by $R_1$ and $R_2$ being independently represented by

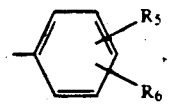

wherein $R_{10}$ is as defined above, are benzyl, o-, m- or p-methylbenzyl, o-, m- or p-methoxybenzyl and o-, m- or p-chlorobenzyl.

The monoazo compound represented by the formula (I) can be produced in the following manner.

Any one of the monoazo chromophore compound of the formula (II), the aromatic amine compound of the formula (III) or the amine compound of the formula (IV) is subjected to first condensation with a cyanuric halide, preferably cyanuric chloride in an aqueous medium, followed by second condensation with one of the remaining two, and then third condensation with the last one, thereby obtaining the desired monoazo compound of the formula (I).

The first condensation can be carried out at a temperature ranging from −10° to 50° C., preferably from 0° to 30° C., while controlling the pH within a range of 1 to 10, preferably 2 to 7, the second condensation at a temperature ranging from 0° to 70° C., preferably from 10° to 50° C., while controlling the pH within a range of 2 to 9, preferably 3 to 6, and the third condensation at a temperature ranging from 50° to 100° C., preferably from 70° to 100° C., while controlling the pH within a range of 2 to 9, preferably 3 to 7.

Alternatively, any one of the naphthalenedisulfonic acid of the formula (V), the aromatic amine compound of the formula (III) or the amine compound (IV) is subjected to first condensation with the cyanuric halide, preferably cyanuric chloride, in an aqueous medium, followed by second condensation with one of the remaining two and then third condensation with the last one, thereby obtaining the triazinyl compound of the formula (VI). The resulting triazinyl compound is then coupled with a diazonium salt of the diazo component of the formula (VII) in an aqueous medium. The first condensation can be carried out at a temperature ranging from −10° to 50° C., preferably from 0° to 30° C., while controlling the pH within a range of 1 to 10, preferably 2 to 7, the second condensation at a temperature ranging from 0° to 70° C., preferably 10° to 50° C., while controlling the pH within a range of 2 to 9, preferably 3 to 6, and the third condensation at a temperature ranging from 50° to 100° C., preferably 70° to 100° C., while controlling the pH within a range of 2 to 9, preferably 3 to 7. The diazonium salt of the diazo component can be prepared in a conventional manner, and the coupling reaction can be carried out at a temperature ranging from −10° to 30° C., preferably 0° to 5° C., while controlling the pH within a range of 1 to 10, preferably 3 to 7.

In the above production manner, the order of condensations is not particularly limited. However, considering the yield and quality of the desired monoazo compound (I), it is preferred to use the one having a lower reactivity to the cyanuric halide for an early condensation reaction.

The amine compound of the formula (IV) includes, aromatic amines and aliphatic amines.

Examples of the aromatic amines are aniline, 1-amino-2-, -3- or -4-methylbenzene, 1-amino-3,4- or -3,5-dimethylbenzene, 1-amino-2-, -3- or -4-ethylbenzene, 1-amino-2-, -3- or -4-methoxybenzene, 1-amino-2-, -3- or -4-ethoxybenzene, 1-amino-2-, -3- or -4-chlorobenzene, 3- or 4-aminophenylmethanesulfonic acid, 4-aminobenzenesulfonic acid, 3-methylaminobenzenesulfonic acid, 3-ethylaminobenzenesulfonic acid, 4-methylaminobenzenesulfonic acid, 4-ethylaminobenzenesulfonic acid, 5-aminobenzene-1,3-disulfonic acid, 6-aminobenzene-1,4-disulfonic acid, 4-aminobenzene-1,2-disulfonic acid, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, N-methylaniline, N-ethylaniline, 1-methylamino-2-, -3- or -4-chlorobenzene, 1-methylamino-2-, -3- or -4-methylbenzene, 1-ethylamino-2-, -3- or -4-chlorobenzene, 1-ethylamino-2-, -3- or -4-methylbenzene, 1-(2-hydroxyethyl)-amino-2-, -3- or -4-methylbenzene, 3- or 4-methylaminobenzoic acid, 3- or 4-methylaminobenzenesulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 4-aminonaphthalene-2-sulfonic acid, 5-aminonaphthalene-2sulfonic acid, 6-aminonaphthalene-2-sulfonic acid, 7-aminonaphthalene-2-sulfonic acid, 7-methylaminonaphthalene-2-sulfonic acid, 7-ethylaminonaphthalene-2-sulfonic acid, 7-butylaminonaphthalene-2-sulfonic acid, 7-isobutylaminonaphthalene-2-sulfonic acid, 8-aminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid and 4-aminonaphthalene-1,3,7-trisulfonic acid.

Examples of the aliphatic amines are methylamine, ethylamine, n-propylamine, iso-propylamine, n-butylamine, iso-butylamine, sec-butylamine, dimethylamine-, diethylamine, methylethylamine, 2-chloroethylamine, 2-methoxyethylamine, 2-aminoethanol, 2-methylaminoethanol, bis-(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, benzylamine, 2-, 3- or 4-chlorobenzylamine, 4-methylbenzylamine, 4-methoxybenzylamine and N-methylbenzylamine.

Of these amine compounds, preferred are aniline, N-methylaniline, N-ethylaniline, 1-amino-2-, -3- or -4-chlorobenzene, 1-methylamino-2-, -3- or -4-chlorobenzene, 1-ethylamino-2-, -3- or -4-chlorobenzene, 3- or 4-aminobenzenesulfonic acid, 3- or 4-methylaminobenzenesulfonic acid, 3- or 4-ethylaminobenzenesulfonic acid, 1-ethylamino-2-, -3- or -4-methylbenzene and the like.

Examples of the napthalenedisulfonic acid of the formula (V) are 1-amino-8-hydroxynaphthalene-3,6-disulfonic acid and 1-amino-8-hydroxynaphthalene-4,6-disulfonic acid.

Examples of the diazo component of the formula (VII) are 2-aminobenzenesulfonic acid, 2-amino-5-methylbenzenesulfonic acid, 2-amino-5-ethylbenzenesulfonic acid, 2-amino-5-methoxybenzenesulfonic acid, 2-amino-5-ethoxybenzenesulfonic acid, 2-amino-5-chlorobenzenesulfonic acid, 2-amino-5-bromobenzenesulfonic acid, 2-amino-5-acetylaminobenzenesulfonic acid, 2-amino-5-propionylaminobenzenesulfonic acid, 2-amino-5-nitrobenzenesulfonic acid, 2-amino-4-chloro-5-methylbenzenesulfonic acid, 2-amino-5-chloro-4-methylbenzenesulfonic acid, 2-amino-4-methoxybenzenesulfonic acid, 2-amino-4-ethoxybenzenesulfonic acid, 3-amino-4-methylbenzenesulfonic acid, 3-amino-4-ethylbenzenesulfonic acid, 3-amino-4-methoxybenzenesulfonic acid, 3-amino-4-ethoxybenzenesulfonic acid, 3-amino-4-chlorobenzenesulfonic acid, 3-amino-4-bromobenzenesulfonic acid, 4-amino-3-methylbenzenesulfonic acid, 4-amino-3-ethylbenzenesulfonic acid, 4-amino-3-methoxybenzenesulfonic acid, 4-amino-3-ethoxybenzenesulfonic acid, 4-amino-3-chlorobenzenesulfonic acid, 4-amino-3-nitrobenzenesulfonic acid, 2-aminobenzene-1,4-disulfonic acid, 2-aminobenzene-1,5-disulfonic acid, 2-aminobenzoic acid, 2-amino-4-methoxybenzoic acid, 2-amino-5-methoxybenzoic acid, 2-amino-4-acetylaminobenzoic acid, 2-amino-5-acetylaminobenzoic acid, 2-amino-4-sulfobenzoic acid, 2-amino-5-sulfobenzoic acid, 4-amino-2,5-dimethylbenzenesulfonic acid, 4-amino-2,5-diethylbenzenesulfonic acid, 4-amino-2,5-dimethoxybenzenesulfonic acid, 4-amino-2,5-diethoxybenzenesulfonic acid, 4-amino-2,5-dichlorobenzenesulfonic acid, 4-amino-2,5-dibromobenzenesulfonic acid, 4-amino-2-methyl-5-methoxybenzenesulfonic acid, 4-amino-2-methyl-5-ethoxybenzenesulfonic acid, 2-amino-5-methylbenzene-1,4-disulfonic acid, 2-amino-5-ethylbenzene-1,4-disulfonic acid, 2-amino-5-methoxybenzene-1,4-disulfonic acid, 2-amino-5-ethoxybenzene-1,4-disulfonic acid, 2-amino-5-acetylaminobenzene-1,4-disulfonic acid, 2-amino-5-propionylaminobenzene-1,4-disulfonic acid, 2-aminonaphthalene-1-sulfonic acid, 6-aminonaphthalene-1-sulfonic acid, 7-aminonaphthalene-1-sulfonic acid, 6-aminonaphthalene-2-sulfonic acid, 7-aminonaphthalene-2-sulfonic acid, 6-aminonaphthalene-1,3-disulfonic acid, 7-aminonaphthalene-1,3-disulfonic acid, 2-aminonaphthalene-1,5-disulfonic acid, 3-aminonaphthalene-1,5-disulfonic acid, 3-aminonaphthalene-2,6-disulfonic acid, 3-aminonaphthalene-2,7-disulfonic acid, 6-aminonaphthalene-1,3,5-trisulfonic acid, 7-aminonaphthalene-1,3,5-trisulfonic acid, 7-aminonaphthalene-1,3,6-trisulfonic acid and the like.

Of these diazo components, preferred are 2-aminobenzenesulfonic acid, 2-amino-5-methylbenzenesulfonic acid, 2-amino-5-ethylbenzenesulfonic acid, 2-amino-5-methoxybenzenesulfonic acid, 2-amino-5-ethoxybenzenesulfonic acid, 2-amino-5-chlorobenzenesulfonic acid, 2-aminobenzene-1,5-disulfonic acid, 2-aminobenzene-1,4-disulfonic acid, 2-aminonaphthalene-1-sulfoic acid, 2-aminonaphthalene-1,5-dilsulfonic acid, 6-aminonaphthalene-1,3,5-trisulfonic acid and the like.

The monoazo compound (I) in accordance with the present invention may be in the form of a free acid or a salt of an alkali metal or alkaline earth metal, preferably in the form of sodium, potassium or lithium salt.

The monoazo compound (I) of the present invention is fiber-reactive and useful for dyeing or printing hydroxyl group-containing and amide group-containing materials. The materials are favorably in a fibrous form including unmixed or mixed fiber spinning.

The hydroxyl group-containing materials include natural or synthetic hydroxyl group-containing materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose. Examples of the cellulose-containing fiber materials are mixed fiber materials such as cellulose/polyester, cellulose/wool, cellulose/acryl and the like.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, optionally together with dissolving assistants, penetrants or level dyeing agents. The neutral salt which can be used for promoting exhaustion of the dye may be added to a dye bath at the time when a bath temperature reaches a level desired for the dyeing, or prior thereto. Alternatively, the neutral salt may be added thereto dividedly.

The padding can be carried out by padding the fiber materials at ambient temperature or an elevated temperature, and after drying, steaming or dry-heating the materials to perform the dye-fixation.

The printing can be carried out in a one-phase or two-phase manner. The one-phase printing may be conducted by printing the fiber materials with a printing paste containing an acid binding agent such as sodium hydrogencarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as a condensation product between cyanuric chloride and 3 times by mole of aminobenzene-sulfonic acid or aminonaphthalenesulfonic acid, or an addition product between stearylamine and ethylene oxide, and the like.

The present monoazo compound (I) can be characterized by excellent dye performances in the dyeing and printing of fiber materials, particularly cellulose fiber materials. For example, the compound can give a dyed product excellent in light fastness, perspiration-light fastness, formalin fastness, wet fastness such as washing resistance, peroxide-washing resistance, chlorine resistance, chlorine bleaching resistance, perspiration resistance and acid-hydrolysis resistance, and alkali fastness, abrasion fastness and iron fastness. The monoazo compound (I) can also exhibit excellent build-up, level-dyeing and wash-off properties and high solubility as well as high exhaustion and fixation percentages. Moreover, when used for the dyeing or printing, the monoazo compound (I) can hardly be affected by changes in a dyeing temperature, an alkali agent, an amount of inorganic salts and bath ratio, so that a dyed or printed product with a constant quality can be obtained with superior reproducibility.

Further, particularly when applied for the dyeing by the cold batch-up dyeing method, the monoazo compound (I) can exhibit excellent build-up property and alkali stability (almost no hydrolysis by the action of the alkali agent) and almost no difference in the depth and shade appears between the dyed products obtained by fixing at 25° C. and at a lower temperature than that.

The present invention is illustrated in more detail with reference to the following Examples, which are only illustrative, but not limitative. In Examples, all parts and % are by weight.

EXAMPLE 1

A monoazo chromophore compound (50.4 parts) represented by the following formula in a free acid form,

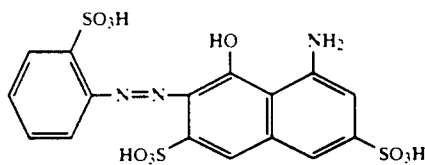

was dissolved in water (500 parts), and cyanuric chloride (18.5 parts) was added thereto. The mixture was stirred at a temperature of 0° to 5° C. for 3 hours, while controlling the pH within a range of 2 to 3 using 20% aqueous sodium carbonate solution, performing a first condensation Successively, 1-aminobenzene-3-β-sulfatoethylsulfone (28.1 parts) was added to the first condensation reaction mixture, and the resulting mixture was heated to 40° C., while controlling the pH within a range of 5 to 6 using 20% aqueous sodium carbonate solution, and then stirred at that temperature and at that pH for 10 hours to perform a second condensation reaction.

Thereafter, N-ethylaniline (12.1 parts) was added to the second condensation reaction mixture, and the resulting mixture was heated to 80° C., while controlling the pH within a range of 5 to 6 using 20% aqueous sodium carbonate solution, and stirred at that temperature and at pH 6 for 6 hours to perform a third condensation reaction. Thereafter, sodium chloride was added thereto, and the precipitate was collected on a suction filter, washed and then dried at 60° C. to obtain a monoazo compound represented by the following formula (1) in a free acid form.

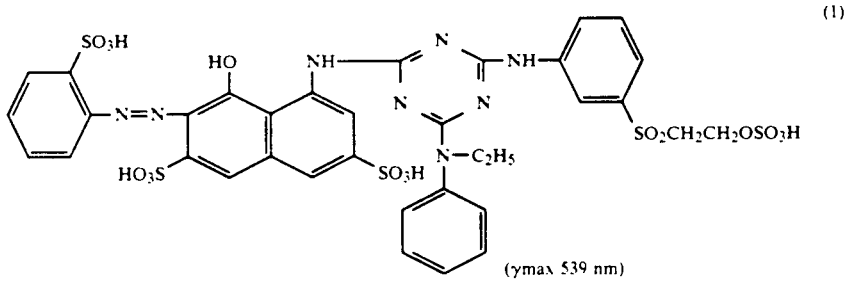

(1)

(γmax 539 nm)

EXAMPLES 2 TO 13

Example 1 was repeated, provided that the monoazo chromophore compound (II) as shown in a second column of the following table, the aromatic amine compound (III) as shown in a third column and the amine compound (IV) as shown in a fourth column were used in place of the monoazo chromophore compound, 1-aminobenzene-3-β-sulfatoethylsulfone and N-ethylaniline used in Example 1, respectively, whereby the corresponding monoazo compound capable of dyeing cotton in a shade as shown in a fifth column was obtained.

| Example No. | Monoazo chromophore compound (II) | Aromatic amine compound (III) | Amine compound (IV) | Shade |
|---|---|---|---|---|
| 2 | ![structure] | H₂N—⟨⟩—SO₂CH=CH₂ | NHC₂H₅ on phenyl | Red |
| 3 | " | H₂N—⟨⟩—SO₂CH₂CH₂OSO₃H | " | " |
| 4 | " | H₂N—⟨⟩—SO₂CH₂CH₂OSO₃H | NHCH₂CH₂CH₃ on phenyl | " |
| 5 | " | " | NHCH₂CH₂CN on phenyl | " |

| Example No. | Monoazo chromophore compound (II) | Aromatic amine compound (III) | Amine compound (IV) | Shade |
|---|---|---|---|---|
| 6 | " | " | NHCH₂CH₂OH (phenyl) | " |
| 7 | SO₃H-phenyl-N=N-[HO, NH₂, HO₃S, SO₃H naphthalene] | H₂N-phenyl-SO₂CH₂CH₂OSO₃H | NHCH₂CH₂COOH (phenyl) | Red |
| 8 | " | H₂N-phenyl(OCH₃)-SO₂CH₂CH₂OSO₃H | NHC₂H₅ (phenyl) | " |
| 9 | " | H₂N-phenyl(OCH₃)-SO₂CH₂CH₂OSO₃H | NHC₂H₄CONH₂ (phenyl) | " |
| 10 | " | H₂N-phenyl(OCH₃, CH₃)-SO₂CH₂CH₂OSO₃H | NHC₂H₄CN (phenyl) | " |
| 11 | " | H₂N-phenyl(SO₃H)-SO₂CH₂CH₂OSO₃H | NHC₂H₅ (phenyl) | " |
| 12 | SO₃H-phenyl-N=N-[HO, NH₂, HO₃S, SO₃H naphthalene] | H₂N-phenyl-SO₂CH₂CH₂OCOCH₃ | NHC₂H₅ (phenyl) | Red |
| 13 | " | H₂N-phenyl-SO₂CH₂CH₂OPO₃H₂ | " | " |

EXAMPLE 14

Cyanuric chloride (18.5 parts) was dispersed in ice water (1000 parts), and N-ethyl-4-chloroaniline (15.6 parts) was added thereto. The mixture was stirred at 0° to 10° C., while controlling the pH within a range of 2 to 4 using 20% aqueous sodium carbonate solution, to perform a first condensation reaction.

Successively, a monoazo chromophore compound (50.4 parts) represented by the following formula in a free acid form,

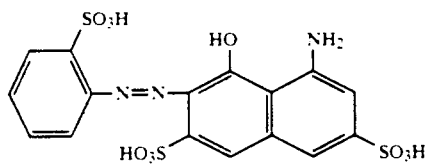

stirred at that temperature and at that pH for 12 hours to perform a third condensation reaction. Sodium chloride was added thereto, and the precipitate was collected on a suction filter, washed and then dried at 60° C. to obtain a monoazo compound represented by the following formula (14) in a free acid form.

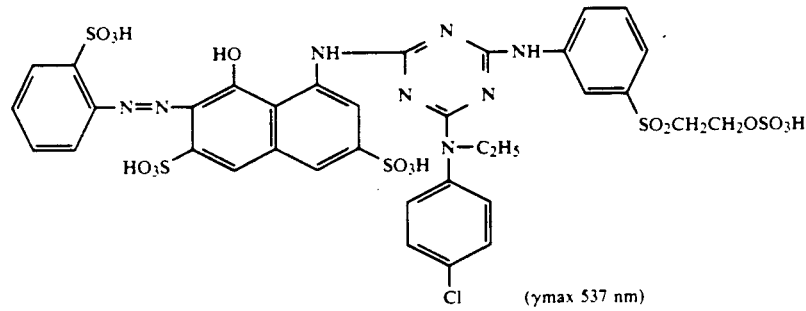

(14)

($\gamma$max 537 nm)

was added to the first reaction mixture, and the resulting mixture was stirred at 20° to 40° C., while controlling the pH within a range of 3 to 5, to perform a second condensation reaction.

Thereafter, 1-aminobenzene-3-$\beta$-sulfatoethylsulfone (28.1 parts) was added to the second reaction mixture, and the resulting mixture was heated to 60° to 70° C., while controlling the pH within a range of 4 to 5 using 20% aqueous sodium carbonate solution, and then

EXAMPLES 15 TO 32

Example 14 was repeated, provided that the monoazo chromophore compound (II) as shown in a second column of the following table, the aromatic amine compound (III) as shown in a third column and the amine (IV) as shown in a fourth column were used in place of the monoazo chromophore compound, 1-aminobenzene-3-$\beta$-sulfatoethylsulfone and N-ethyl-4-chloroaniline used in Example 14, respectively, whereby the corresponding monoazo compound was obtained.

| Example No. | Monoazo chromophore compound (II) | Aromatic amine compound (III) | Amine compound (IV) | Shade |
|---|---|---|---|---|
| 15 | [structure: SO3H, HO, NH2, N=N, HO3S, SO3H naphthalene] | H2N—⌬—SO2CH=CH2 | NHC2H5, ⌬—Cl | Red |
| 16 | " | H2N—⌬—SO2CH2CH2OSO3H | NHCH3, ⌬—Cl | " |
| 17 | " | " | NHC2H5, ⌬—Cl (ortho) | " |
| 18 | " | " | NHC2H5, ⌬—Br | " |
| 19 | " | " | NHCH2CH2CN, ⌬—CH3 | " |
| 20 | [structure: SO3H, HO, NH2, N=N, HO3S, SO3H naphthalene] | H2N—⌬—SO2CH2CH2OSO3H | NHCH2CH2CN, ⌬—C2H5 | Red |

-continued

| Example No. | Monoazo chromophore compound (II) | Aromatic amine compound (III) | Amine compound (IV) | Shade |
|---|---|---|---|---|
| 21 | 2-sulfo-4-methylphenyl-azo-1-hydroxy-8-amino-3,6-disulfonaphthalene | $H_2N$—C$_6$H$_4$—SO$_2$CH$_2$CH$_2$OSO$_3$H (para) | $C_6H_5$—NHCH$_2$CH$_2$OH | Bluish red |
| 22 | " | 2-amino-5-(β-sulfatoethylsulfonyl)benzenesulfonic acid | 4-Cl-$C_6H_4$—NHC$_2$H$_5$ | Bluish red |
| 23 | " | 3-amino-($\beta$-sulfatoethylsulfonyl)benzene | 4-Cl-$C_6H_4$—NHCH$_3$ | Bluish red |
| 24 | 2-sulfo-4-methylphenyl-azo-1-hydroxy-8-amino-3,5-disulfonaphthalene | " | " | Red |
| 25 | 2-sulfo-4-methylphenyl-azo-1-hydroxy-8-amino-3,5-disulfonaphthalene | 3-amino-($\beta$-sulfatoethylsulfonyl)benzene | $C_6H_5$—NHC$_2$H$_5$ | Red |
| 26 | " | 2-methoxy-5-($\beta$-sulfatoethylsulfonyl)aniline | " | " |
| 27 | 2-sulfo-4-methoxyphenyl-azo-1-hydroxy-8-amino-3,6-disulfonaphthalene | 2,5-dimethoxy-4-($\beta$-sulfatoethylsulfonyl)aniline | 3-OCH$_3$-$C_6H_4$—NHCH$_2$CH$_2$COOH | Reddish violet |
| 28 | 2-sulfo-4-methoxyphenyl-azo-1-hydroxy-8-amino-3,6-disulfonaphthalene | $H_2N$—C$_6H_4$—SO$_2$CH$_2$CH$_2$OSO$_3$H | 3-OC$_2$H$_5$-$C_6H_4$—NHCH$_2$CH$_2$CN | Bluish red |
| 29 | 2,5-disulfophenyl-azo-1-hydroxy-8-amino-3,6-disulfonaphthalene | " | 4-Cl-$C_6H_4$—NHC$_2$H$_5$ | Red |
| 30 | 2,5-disulfophenyl-azo-1-hydroxy-8-amino-3,6-disulfonaphthalene | 3-amino-($\beta$-sulfatoethylsulfonyl)benzene | 4-Cl-$C_6H_4$—NHC$_2$H$_5$ | Red |
| 31 | 2,4-disulfophenyl-azo-1-hydroxy-8-amino-3,6-disulfonaphthalene | " | " | " |

-continued

| Example No. | Momoazo chromophore compound (II) | Aromatic amine compound (III) | Amine compound (IV) | Shade |
|---|---|---|---|---|
| 32 | " | H₂N—⟨⟩—SO₂CH₂CH₂OSO₃H | NHC₂H₅ ⟨⟩ Cl | " |

EXAMPLE 33

A monoazo chromophore compound (50.4 parts) represented by the following formula in a free acid form,

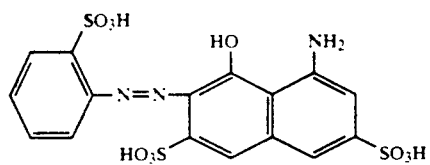

was dissolved in water (500 parts), and cyanuric chloride (18.5 parts) was added to the solution. The mixture was stirred at 0° to 5° C. for 3 hours, during which the pH was controlled within a range of 2.5 to 3.5 using 20% aqueous sodium carbonate solution, performing a first condensation reaction.

Successively, 1-N-ethylaminobenzene-3-β-sulfatoethylsulfone (30.9 parts) was added to the first condensation reaction mixture, and the resulting mixture was heated to 40° C., while controlling the pH within a range of 5 to 6, and then stirred at that temperature and at that pH for 10 hours to perform a second condensation reaction.

Thereafter, aniline (9.3 parts) was added to the second condensation reaction mixture, and the resulting mixture was heated up to 80° C., while controlling the pH within a range of 5 to 6 using 20% aqueous sodium carbonate solution, and then stirred at that temperature and at that pH for 6 hours to perform a third condensation reaction. Sodium chloride was added thereto, and the precipitate was collected on a suction filter, washed and then dried at 60° C. to obtain a monoazo compound represented by the following formula (33) in a free acid form.

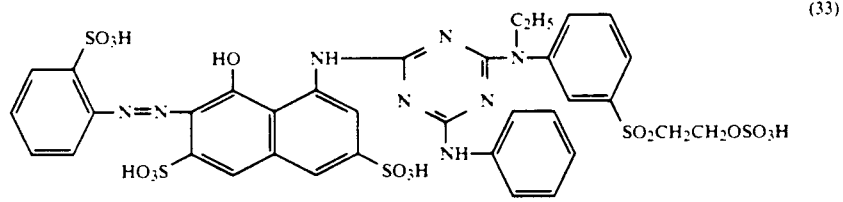

(λmax 530 nm)

EXAMPLES 34 TO 63

Example 33 was repeated, provided that the monoazo chromophore compound (II) as shown in a second column of the following table, the aromatic amine compound (III) as shown in a third column and the amine compound (IV) as shown in a fourth column were used in place of the monoazo chromophore compound, 1-N-ethylaminobenzene-3-β-sulfatoethylsulfone and aniline used in Example 33, respectively, whereby the corresponding monoazo compound was obtained.

| Example No. | Monoazo chromophore compound (II) | Aromatic amine compound (III) | Amine compound (IV) | Shade |
|---|---|---|---|---|
| 34 | SO₃H, HO, NH₂ structure with N=N, HO₃S, SO₃H | C₂H₅\HN—⟨⟩—SO₂CH=CH₂ | NH₂ ⟨⟩ | Red |
| 35 | " | C₂H₅\HN—⟨⟩—SO₂CH₂CH₂OSO₃H | NHCH₃ ⟨⟩ | " |
| 36 | " | C₂H₅\HN—⟨⟩—SO₂CH₂CH₂OCOCH₃ | " | " |
| 37 | " | C₂H₅\HN—⟨⟩—SO₂CH₂CH₂SSO₃H | NHC₂H₅ ⟨⟩ | " |

| Example No. | Monoazo chromophore compound (II) | Aromatic amine compound (III) | Amine compound (IV) | Shade |
|---|---|---|---|---|
| 38 | " |  |  | " |
| 39 | 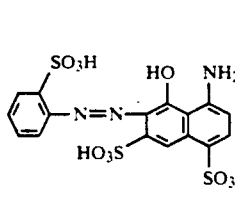 |  |  | Yellowish red |
| 40 | 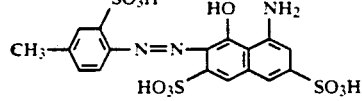 | " | " | Red |
| 41 | " | 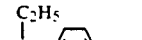 | 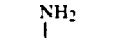 | " |
| 42 | " | 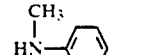 | H₂NCH₂CH₂SO₃H | " |
| 43 | 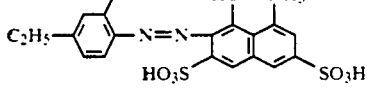 | 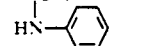 |  | " |
| 44 | 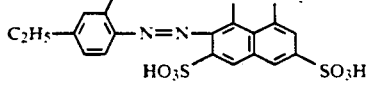 | 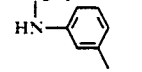 | 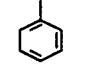 | Red |
| 45 | " | " |  | " |
| 46 | 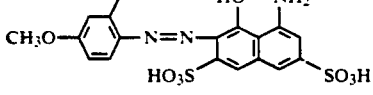 | " |  | Bluish red |
| 47 | " | 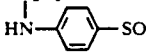 | 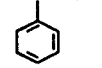 | Bluish red |
| 48 | " | 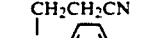 | 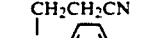 | Bluish red |
| 49 | 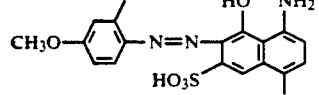 | 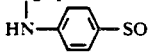 |  | Red |

-continued

| Example No | Monoazo chromophore compound (II) | Aromatic amine compound (III) | Amine compound (IV) | Shade |
|---|---|---|---|---|
| 50 | " | " | 4-aminobenzenesulfonic acid (NH₂-C₆H₄-SO₃H) | " |
| 51 | " | " | 3,5-disulfoaniline (NH₂-C₆H₃(SO₃H)₂) | " |
| 52 | 2-ethoxy-substituted monoazo: C₂H₅O-C₆H₃(SO₃H)-N=N-naphthalene(OH)(NH₂)(SO₃H)₂ with HO₃S | CH₃-NH-C₆H₄-SO₂CH₂CH₂OSO₃H | aniline (NH₂-C₆H₅) | " |
| 53 | " | C₂H₅-NH-C₆H₃(OCH₃)-SO₂CH₂CH₂OSO₃H | " | " |
| 54 | C₂H₅O-C₆H₃(SO₃H)-N=N-naphthalene(OH)(NH₂)(SO₃H)(HO₃S) | CH₂CH₂COOH-N(H)-C₆H₃(OCH₃)-SO₂CH₂CH₂OSO₃H | 3-aminobenzenesulfonic acid (NH₂-C₆H₄-SO₃H) | Red |
| 55 | Cl-C₆H₃(SO₃H)-N=N-naphthalene(OH)(NH₂)(SO₃H)(HO₃S) | C₂H₅-NH-C₆H₄-SO₂CH₂CH₂OSO₃H | " | " |
| 56 | " | CH₂CH₂OH-N(H)-C₆H₄-SO₂CH₂CH₂OSO₃H | NH(CH₂CH₂OH)₂ | " |
| 57 | " | CH₂CH₂OCH₃-N(H)-C₆H₄-SO₂CH₂CH₂OSO₃H | benzylamine (C₆H₅-CH₂NH₂) | " |
| 58 | C₂H₅CONH-C₆H₃(SO₃H)-N=N-naphthalene(OH)(NH₂)(SO₃H)(HO₃S) | CH₃-NH-C₆H₄-SO₂CH₂CH₂OSO₃H | 3-methylaniline (NH₂-C₆H₄-CH₃) | Bluish red |
| 59 | C₂H₅CONH-C₆H₃(SO₃H)-N=N-naphthalene(OH)(NH₂)(SO₃H)(HO₃S) | CH₃-NH-C₆H₂(CH₃)(OCH₃)-SO₂CH₂CH₂OSO₃H | N-methylaniline (NHCH₃-C₆H₅) | Red |
| 60 | C₆H₄(SO₃H)-N=N-naphthalene(OH)(NH₂)(SO₃H)(HO₃S) | CH₃-NH-C₆H₄-SO₂CH₂CH₂OSO₃H | aniline (NH₂-C₆H₅) | " |
| 61 | " | CH₃-NH-C₆H₄-SO₂CH₂CH₂OSO₃H | " | " |

-continued

| Example No. | Monoazo chromophore compound (II) | Aromatic amine compound (III) | Amine compound (IV) | Shade |
|---|---|---|---|---|
| 62 | HO₃S—[naphthalene with HO, NH₂, SO₃H, HO₃S substituents]—SO₃H | " | [naphthalene with SO₃H, SO₃H, NH₂ substituents] | Bluish red |
| 63 | [benzene with SO₃H, SO₃H]—N=N—[naphthalene with HO, NH₂, HO₃S, SO₃H] | " | NH₂CH₂CH₂OH | Bluish red |

EXAMPLE 64

Example 1 was repeated, provided that p-chloroaniline was used in place of N-ethylaniline, thereby obtaining a monoazo compound represented by the following formula (64) in a free acid form.

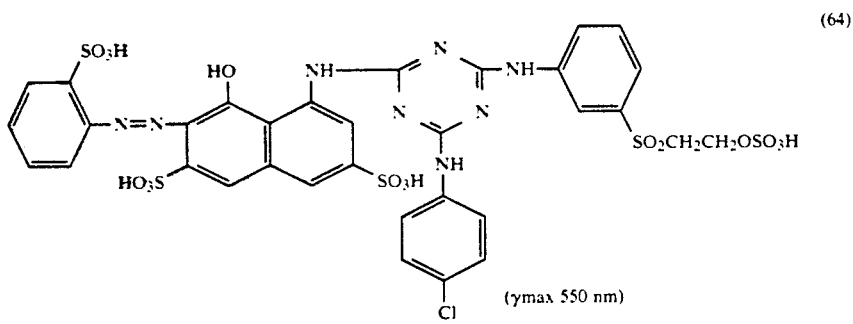

(γmax 550 nm)

EXAMPLE 65

A compound (31.9 parts) represented by the following formula in a free acid form,

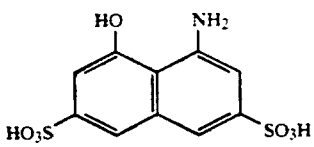

was dissolved in water (300 parts), and cyanuric chloride (18.5 parts) was added to the solution. The mixture was stirred at 0° to 5° C. for 3 hours, during which the pH was controlled within a range of 2.5 to 3.5 using 20% aqueous sodium carbonate solution, thereby performing a first condensation reaction.

Successively, 1-aminobenzene-4-β-sulfatoethylsulfone (28.1 parts) was added to the first condensation reaction mixture. The resulting mixture was heated up to 40° C., while controlling the pH within a range of 4 to 5 using 20% aqueous sodium carbonate solution, and then stirred for 10 hours at that temperature and at that pH to perform a second condensation reaction.

Thereafter, o-chloroaniline was added to the second condensation reaction mixture. The resulting mixture was heated up to 70° C., while controlling the pH within a range of 4 to 5 using 20% aqueous sodium carbonate solution, and then stirred for 6 hours at that temperature and at that pH to perform a third condensation reaction.

On the other hand, 1-aminobenzene-2-sulfonic acid (17.3 parts) and 35% hydrochloric acid (31 parts) were mixed with water (100 parts), and then 35% aqueous sodium nitrite solution (20 parts) was dropwise added thereto, while stirring at 0° to 5° C. Then, the mixture was stirred for 2 hours at that temperature.

Thereafter, excess nitrous acid therein was decomposed, and to this diazonium salt solution was added the above third condensation reaction mixture. The mixture was stirred at 0° to 5° C. for 10 hours, during which the pH was controlled within a range of 5 to 6 using 20% aqueous sodium carbonate solution, thereby performing a coupling reaction. Sodium chloride (30 parts) was added thereto. The precipitate was collected on a suction filter and dried at 60° C. to obtain a monoazo compound represented by the following formula (65) in a free acid form.

(65)

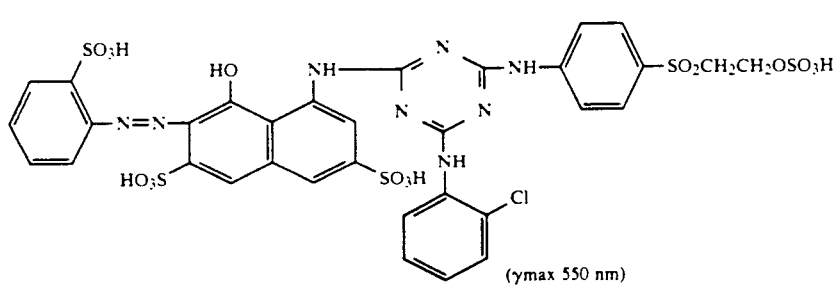

(γmax 550 nm)

EXAMPLES 66 TO 83

Example 65 was repeated, provided that the amine compound (VII) as shown in a second column of the following table, the naphthalenedisulfonic acid (V) as shown in a third column, the aromatic amine compound (III) as shown in a fourth column, and the amine compound (IV) as shown in a fifth column (IV) were used in place of 1-aminobenzene-2-sulfonic acid, 1-amino-8-naphthol-3,6-disulfonic acid, 1-aminobenzene-4-β-sulfatoethylsulfone and o-chloroaniline used in Example 65, respectively, thereby obtaining the corresponding monoazo compound giving a color on cotton as shown in a sixth column.

| Example No. | Amine compound (VII) | Naphthalenedisulfonic acid (V) | Aromatic amine compound (III) | Amine compound (IV) | Shade |
|---|---|---|---|---|---|
| 66 | ⟨SO₃H, NH₂⟩ | HO NH₂ / HO₃S–SO₃H | H₂N–⟨⟩–SO₂CH₂CH₂OSO₃H | H₂N–⟨⟩–Cl | Red |
| 67 | " | HO NH₂ / HO₃S–SO₃H | " | H₂N–⟨⟩–Cl | Yellowish red |
| 68 | " | HO NH₂ / HO₃S–SO₃H | " | H₂N–⟨⟩–Cl (ortho) | Red |
| 69 | " | HO NH₂ / HO₃S–SO₃H | OCH₃ / H₂N–⟨⟩–SO₂CH₂CH₂OSO₃H | " | Yellowish red |
| 70 | " | HO NH₂ / HO₃S–SO₃H | HO₃S / H₂N–⟨⟩–SO₂CH₂CH₂OSO₃H | H₂N–⟨⟩–Cl | Red |
| 71 | ⟨SO₃H, NH₂⟩ | HO NH₂ / HO₃S–SO₃H | H₂N–⟨⟩–SO₂CH₂CH₂OSO₃H | H₂N–⟨⟩–Cl | Red |
| 72 | " | HO NH₂ / HO₃S–SO₃H | OCH₃ / H₂N–⟨⟩–SO₂CH₂CH₂OSO₃H / OCH₃ | " | " |
| 73 | H₃C–⟨SO₃H, NH₂⟩ | HO NH₂ / HO₃S–SO₃H | H₂N–⟨⟩–SO₂CH₂CH₂OSO₃H | " | Bluish red |

-continued

| Example No | Amine compound (VII) | Naphthalenedi-sulfonic acid (V) | Aromatic amine compound (III) | Amine compound (IV) | Shade |
|---|---|---|---|---|---|
| 74 | " | " | ![structure: 2-OCH3, 5-CH3, SO2CH2CH2OSO3H aniline] | ![2-chloroaniline] | Bluish red |
| 75 | " | " | H2N—C6H4—SO2CH=CH2 (para) | H2N—C6H4—Cl (para) | Bluish red |
| 76 | 2-amino-5-methylbenzenesulfonic acid (H3C, SO3H, NH2) | 1-amino-8-hydroxynaphthalene-3,6-disulfonic acid (HO, NH2, HO3S, SO3H) | H2N—C6H3(SO3H)—SO2CH2CH2OSO3H | H2N—C6H4—Cl (meta) | Red |
| 77 | 2-amino-5-methoxybenzenesulfonic acid (H3CO, SO3H, NH2) | 1-amino-8-hydroxynaphthalene-3,6-disulfonic acid | H2N—C6H4—SO2CH2CH2OSO3H | H2N—C6H4—Cl (para) | Reddish violet |
| 78 | " | " | ![3-OCH3, SO2CH2CH2OSO3H aniline] | ![2-chloroaniline] | Reddish violet |
| 79 | " | " | H2N—C6H4—SO2CH=CH2 (meta) | " | Reddish violet |
| 80 | " | 1-amino-8-hydroxynaphthalene-3,6-disulfonic acid | H2N—C6H3(SO3H)—SO2CH2CH2OSO3H | H2N—C6H4—Cl (para) | Bluish red |
| 81 | 2-aminobenzene-1,4-disulfonic acid (HO3S, SO3H, NH2) | 1-amino-8-hydroxynaphthalene-3,6-disulfonic acid | H2N—C6H4—SO2CH2CH2OSO3H (meta) | H2N—C6H4—Cl (para) | Red |
| 82 | " | " | H2N—C6H4—SO2CH2CH2OSO3H (para) | " | " |
| 83 | " | " | H2N—C6H4—SO2CH=CH2 (meta) | " | " |

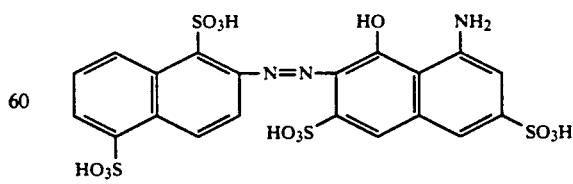

EXAMPLE 84

A monoazo chromophore compound (63.4 parts) represented by the following formula in a free acid form, was dissolved in water (500 parts), and cyanuric chloride (18.5 parts) was added to the solution. The mixture was stirred at 0° to 5° C., while controlling the pH within a range of 2.5 to 3.5 using 20% aqueous sodium carbonate solution, thereby performing a first condensation reaction.

Successively, 2-aminonaphthalene-6-β-sulfatoethylsulfone-1-sulfonic acid (41.1 parts) was added to the first condensation reaction mixture. The resulting mixture was heated up to 40° C., while controlling the pH within a range of 4 to 5 using 20% aqueous sodium carbonate solution, and then stirred for 10 hours at that temperature and at that pH to perform a second condensation reaction.

Thereafter, aniline (9.3 parts) was added to the second condensation reaction mixture, and the resulting mixture was heated up to 80° C., while controlling the pH within a range of 4 to 5 using 20% aqueous sodium carbonate solution, and then stirred for 6 hours at that temperature and at that pH to perform a third condensation reaction. Then, sodium chloride (25 parts) was added thereto.

The precipitate was collected on a suction filter, washed and then dried at 60° C. to obtain a monoazo compound represented by the following formula (84) in a free acid form.

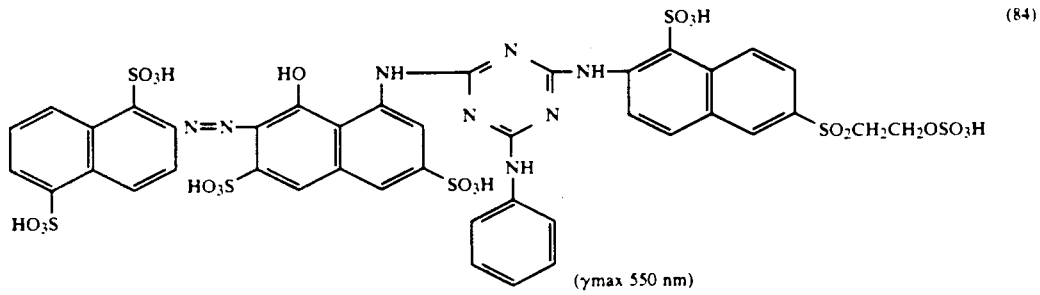

(λmax 550 nm)

EXAMPLES 85 TO 120

Example 84 was repeated, provided that the monoazo chromophore compound (II) as shown in a second column of the following table, the aromatic amine compound (III) as shown in a third column and the amine compound (IV) as shown in a fourth column were used in place of the monoazo chromophore compound, 2-aminonaphthalene-6-β-sulfatoethylsulfone-1-sulfonic acid and aniline used in Example 84, respectively, whereby the corresponding monoazo compound was obtained.

| Example No. | Monoazo chromophore compound (II) | Aromatic amine compound (III) | Amine compound (IV) | Shade |
|---|---|---|---|---|
| 85 | [structure with SO₃H, HO, NH₂, N=N, HO₃S, SO₃H on naphthalene] | [2-aminonaphthalene-1-SO₃H-6-SO₂CH=CH₂] | NHCH₃-phenyl | Bluish red |
| 86 | " | [2-aminonaphthalene-1-SO₃H-6-SO₂CH₂CH₂OSO₃H] | " | Bluish red |
| 87 | " | [2-(N-methylamino)naphthalene-1-SO₃H-6-SO₂CH₂CH₂OSO₃H] | NH₂-phenyl | Bluish red |
| 88 | " | [2-aminonaphthalene-1-SO₃H-6-SO₂CH₂CH₂OSO₃H] | 3-NH₂-phenyl-SO₃H | Bluish red |
| 89 | " | " | 2-methylaniline (H₃C-phenyl-NH₂) | Bluish red |
| 90 | [structure with SO₃H, HO, NH₂, N=N, HO₃S, SO₃H on naphthalene] | [2-aminonaphthalene-1-SO₃H-6-SO₂CH₂CH₂OSO₃H] | 2-ethylaniline (H₅C₂-phenyl-NH₂) | Bluish red |
| 91 | " | " | NHC₂H₅-phenyl | " |

| Example No. | Monoazo chromophore compound (II) | Aromatic amine compound (III) | Amine compound (IV) | Shade |
|---|---|---|---|---|
| 92 | " | H₂N-naphthalene with SO₃H (1), SO₂CH₂CH₂OSO₃H (5) | H₂NCH₂CH₂SO₃H | Bluish red |
| 93 | " | H₂N-naphthalene with SO₂CH₂CH₂OSO₃H, SO₃H | " | Bluish red |
| 94 | " | " | aniline (NH₂) | Bluish red |
| 95 | naphthalene-SO₃H-N=N-[HO,NH₂-naphthalene-HO₃S,SO₃H] | H₂N-naphthalene with SO₂CH₂CH₂OSO₃H, SO₃H | N-methylaniline (NHCH₃) | Bluish red |
| 96 | " | HN(C₂H₅)-naphthalene-SO₂CH₂CH₂OSO₃H | NH₂CH₂CH₂OH | Bluish red |
| 97 | naphthalene-SO₃H-N=N-[HO,NH₂-naphthalene-HO₃S,SO₃H] | H₂N-naphthalene with SO₃H, SO₂CH₂CH₂OSO₃H | N-methylaniline (NHCH₃) | Red |
| 98 | " | " | 4-aminobenzenesulfonic acid (NH₂, SO₃H) | " |
| 99 | " | H₂N-naphthalene with SO₃H, SO₂CH₂CH₂OSO₃H | " | " |
| 100 | naphthalene-SO₃H-N=N-[HO,NH₂-naphthalene-HO₃S,SO₃H] | H₂N-naphthalene with SO₃H, SO₂CH₂CH₂OSO₃H | N-ethylaniline (NHC₂H₅) | Red |
| 101 | " | HN(CH₂CH₂OH)-naphthalene-SO₂CH₂CH₂OCOCH₃ | NH(CH₂CH₂OH)₂ | " |
| 102 | " | HN(CH₂CH₂COOH)-naphthalene-SO₂CH₂CH₂SSO₃H | 5-aminobenzene-1,3-disulfonic acid (NH₂, HO₃S, SO₃H) | " |
| 103 | naphthalene-SO₃H,HO₃S-N=N-[HO,NH₂-naphthalene-HO₃S,SO₃H] | H₂N-naphthalene with SO₃H, SO₂CH₂CH₂OSO₃H | aniline (NH₂) | Bluish red |

-continued

| Example No | Monoazo chromophore compound (II) | Aromatic amine compound (III) | Amine compound (IV) | Shade |
|---|---|---|---|---|
| 104 | " | " | NHCH₃ on phenyl | Bluish red |
| 105 | naphthalene with SO₃H, HO, NH₂, N=N, HO₃S, SO₃H, HO₃S substituents | naphthalene with SO₃H, H₂N, SO₂CH₂CH₂OSO₃H | NHC₂H₅ on phenyl | Bluish red |
| 106 | " | " | NH₂ on phenyl with SO₃H | Bluish red |
| 107 | " | naphthalene with CH₃HN, SO₃H, SO₂CH₂CH₂OSO₃H | NH₂ on phenyl | Bluish red |
| 108 | " | " | NH₂ on phenyl with H₅C₂ | Bluish red |
| 109 | " | naphthalene with SO₃H, H₂N, SO₂CH₂CH₂OSO₃H | NH₂ on phenyl with H₃C | Bluish red |
| 110 | naphthalene with SO₃H, HO, NH₂, N=N, HO₃S, SO₃H, HO₃S substituents | naphthalene with SO₃H, H₂N, SO₂CH₂CH₂OPO₃H₂ | NH₂ on phenyl with H₃C | Bluish red |
| 111 | " | naphthalene with SO₂CH₂CH₂OSO₃H, H₂N, SO₃H | " | Bluish red |
| 112 | " | " | NH₂ on phenyl | Bluish red |
| 113 | " | " | NHCH₃ on phenyl | Bluish red |
| 114 | " | naphthalene with SO₂CH₂CH₂OSO₃H, H₂N | NH₂ on phenyl with SO₃H | Bluish red |
| 115 | naphthalene with SO₃H, HO, NH₂, N=N, HO₃S, SO₃H, HO₃S substituents | naphthalene with SO₃H, H₂N, SO₂CH₂CH₂OSO₃H | NH₂ on phenyl | Red |
| 116 | " | " | NHCH₃ on phenyl | " |

-continued

| Example No. | Monoazo chromophore compound (II) | Aromatic amine compound (III) | Amine compound (IV) | Shade |
|---|---|---|---|---|
| 117 | " | H₂N-naphthalene with SO₂CH₂CH₂OSO₃H and SO₃H | H₂NCH₂-C₆H₄-CH₃ | " |
| 118 | " | NCH₂CH₂C / HN-naphthalene with SO₃H and SO₂CH=CH₂ | H₂NCH₂CH₂SO₃H | " |
| 119 | " | H₂N-naphthalene with SO₂CH₂CH₂OSO₃H | H₂N-C₆H₃(SO₃H)(SO₃H) | " |
| 120 | naphthalene-SO₃H, HO₃S, N=N, HO, NH₂, HO₃S, SO₃H | NHC₂H₅-naphthalene-SO₂CH₂CH₂OSO₃H | H₂N-naphthalene with SO₃H, SO₃H | Bluish red |

EXAMPLE 121

Cyanuric chloride (18.5 parts) was dispersed in ice water (500 parts), and to this dispersion was added 2-aminonaphthalene-8-β-sulfatoethylsulfone-6-sulfonic acid (41.1 parts). The mixture was stirred at 0° to 5° C. for 5 hours, during which the pH was controlled within a range of 3 to 4 using 20% aqueous sodium carbonate solution, thereby performing a first condensation reaction.

Successively, a monoazo chromophore compound (55.3 parts) represented by the following formula in a free acid form,

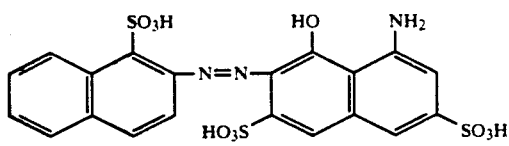

was added to the first condensation reaction mixture. The resulting mixture was heated up to 40° C., while controlling the pH within a range of 4 to 5 using 20% aqueous sodium carbonate solution, and then stirred for 10 hours at that temperature and at that pH to perform a second condensation reaction.

Thereafter, N-ethylaniline (12.1 parts) was added to the second condensation reaction mixture, and the resulting mixture was heated up to 80° C., while controlling the pH within a range of 4 to 5 using 20% aqueous sodium carbonate solution, and then stirred for 10 hours at that temperature and at that pH to perform a third condensation reaction. Sodium chloride (20 parts) was added thereto. The precipitate was collected on a suction filter, washed and dried at 60° C. to obtain a monoazo compound represented by the following formula (121) in a free acid form.

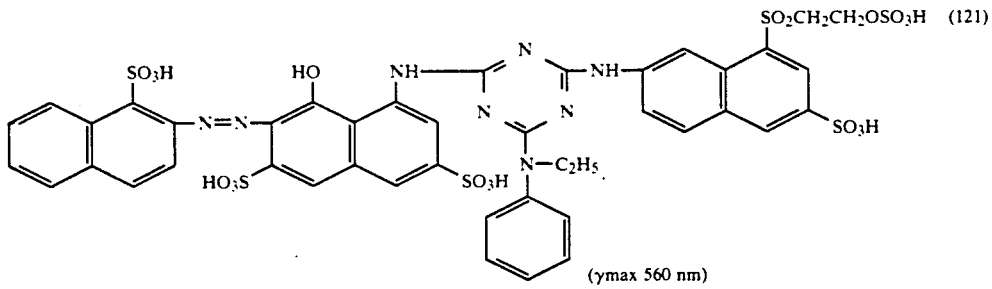

(γmax 560 nm)

EXAMPLES 122 TO 139

Example 121 was repeated, provided that the monoazo chromophore compound (II) as shown in a second column of the following table, the aromatic amine compound (III) as shown in a third column and the amine compound (IV) as shown in a fourth column were used in place of the monoazo chromophore compound, 2-aminonaphthalene-8-β-sulfatoethylsulfone-6-sulfonic acid and N-ethylaniline used in Example 121, respectively, thereby obtaining the corresponding monoazo compound.

| Example No. | Monoazo chromophore compound (II) | Aromatic amine compound (III) | Amine compound (IV) | Shade |
|---|---|---|---|---|
| 122 | HO₃S—[naphthalene(SO₃H)(SO₃H)]—N=N—[naphthalene(OH)(NH₂)(HO₃S)(SO₃H)] | H₂N—[naphthalene(SO₃H)(SO₂CH₂CH₂OSO₃H)] | aniline (NH₂—C₆H₅) | Red |
| 123 | " | H₂N—[naphthalene(SO₃H)(SO₂CH₂CH₂OSO₃H)] | " | " |
| 124 | " | H₂N—[naphthalene(SO₂CH₂CH₂OSO₃H)(SO₃H)] | 3-methylaniline (NH₂—C₆H₄—CH₃) | " |
| 125 | " | H₂N—[naphthalene(SO₃H)(SO₂CH₂CH₂OSO₃H)] | 3-ethylaniline (NH₂—C₆H₄—C₂H₅) | " |
| 126 | " | H₂N—[naphthalene(SO₂CH₂CH₂OSO₃H)] | " | " |
| 127 | HO₃S—[naphthalene(SO₃H)(SO₃H)]—N=N—[naphthalene(OH)(NH₂)(HO₃S)(SO₃H)] | H₂N—[naphthalene—SO₂CH₂CH₂OSO₃H] | 3-aminobenzenesulfonic acid (NH₂—C₆H₄—SO₃H) | Red |
| 128 | " | H₂N—[naphthalene—SO₂CH₂CH₂OSO₃H] | 4-aminobenzoic acid (NH₂—C₆H₄—COOH) | " |
| 129 | " | " | 4-aminobenzoic acid (NH₂—C₆H₄—COOH) | " |
| 130 | " | H₂N—[naphthalene—SO₂CH₂CH₂OSO₃H] | NH₂CH₂CH₂OH | " |
| 131 | " | (C₂H₅)HN—[naphthalene—SO₂CH₂CH₂OSO₃H] | NH(CH₂CH₂OH)₂ | " |
| 132 | HO₃S—[naphthalene(SO₃H)(SO₃H)]—N=N—[naphthalene(OH)(NH₂)(HO₃S)(SO₃H)] | H₂N—[naphthalene(SO₃H)(SO₂CH₂CH₂OSO₃H)] | aniline (NH₂—C₆H₅) | Red |
| 133 | " | H₂N—[naphthalene(SO₃H)(SO₂CH=CH₂)] | 3-aminobenzenesulfonic acid (NH₂—C₆H₄—SO₃H) | " |

| Example No. | Monoazo chromophore compound (II) | Aromatic amine compound (III) | Amine compound (IV) | Shade |
|---|---|---|---|---|
| 134 | HO₃S-naphthalene(SO₃H)-N=N-naphthalene(HO, NH₂, HO₃S, SO₃H) | H₂N-naphthalene(SO₂CH₂CH₂OSO₃H, SO₃H) | NH₂-phenyl | " |
| 135 | " | H₂N-naphthalene(SO₃H, SO₂CH₂CH₂OSO₃H) | NHC₂H₅-phenyl | " |
| 136 | " | " | NH₂CH₂CH₂SO₃H | " |
| 137 | HO₃S-naphthalene(SO₃H, SO₃H)-N=N-naphthalene(HO, NH₂, HO₃S, SO₃H) | H₂N-naphthalene(SO₃H, SO₂CH₂CH₂OSO₃H) | NH₂CH₂CH₂SO₃H | Bluish red |
| 138 | " | H₂N-naphthalene(SO₂CH₂CH₂OSO₃H) | NHCH₃-phenyl | Bluish red |
| 139 | " | HN(CH₃)-naphthalene(SO₂CH₂CH₂OSO₃H) | NH₂-phenyl | Bluish red |

DYEING EXAMPLE 1

The monoazo compounds (1) obtained in Examples 1 (0.3 part) was dissolved in water (200 parts), and sodium sulfate (20 parts) and cotton (10 parts) were added thereto. The bath was heated to 50° C., and 30 minutes thereafter sodium carbonate (4 parts) was added thereto. Dyeing was continued for 1 hour at that temperature. Thereafter, the cotton was washed with water and soaped to obtain a dyed product of a deep red color. The dyed product was excellent in fastness properties, particularly chlorine fastness, light fastness and perspiration light fastness, and the monoazo compound was found to have good build-up property.

DYEING EXAMPLE 2

The monoazo compound obtained in Example 14 (0.3 part) was dissolved in water (150 parts), and sodium sulfate (6 parts) and cotton (10 parts) were added thereto. The bath was heated to 60° C. 20 Minutes thereafter, sodium carbonate (4 parts) was added thereto. Dyeing was continued continued for 1 hour at that temperature. The cotton was washed with water and soaped to obtain a dyed product of a deep red color excellent in fastness properties, particularly chlorine fastness, light fastness and perspiration light fastness, with good build-up property.

DYEING EXAMPLE 3

The monoazo compounds obtained in Examples 1 to 63 each (0.3 part) was dissolved in water (300 parts), and sodium sulfate (15 parts) and cotton (10 parts) were added thereto. The bath was heated to 60° C. 20 Minutes thereafter, sodium carbonate (5 parts) was added thereto, and dyeing was continued for 1 hour at that temperature. The cotton was washed with water and soaped to obtain each dyed product of a deep red color excellent in fastness properties, particularly chlorine fastness, light fastness and perspiration fastness with good buildup property.

DYEING EXAMPLE 4

The monoazo compounds obtained in Examples 14 to 139 each (0. 3 part) was dissolved in water (200 parts), and sodium sulfate (30 parts) and cotton (10 parts) were added thereto. The bath was heated to 50° C. 30 Minutes thereafter, trisodium phosphate (4 parts) was added thereto, and dyeing was continued for 1 hour at that temperature. Thereafter, the cotton was washed with water and soaped to obtain each dyed product of a deep red color excellent in fastness properties, particularly chlorine fastness, light fastness and perspiration light fastness with good build-up property.

DYEING EXAMPLE 5

| Composition of color paste | |
|---|---|
| Monoazo compounds obtained in Examples 1 to 63 | Parts each 5 |
| Urea | 5 |
| Sodium alginate (5%), thickener | 50 |
| Hot water | 25 |
| Sodium hydrogencarbonate | 2 |
| Balance (water) | 13 |

Mercerized cotton broad cloth was printed with the color paste having the composition described above, and then pre-dried, subjected to steaming at 100° C., for 5 minutes, rinsed with hot water, soaped, again rinsed with hot water, and then dried. Thus, there was obtained each printed product of a deep red color excellent in fastness properties, particularly chlorine fastness, light fastness and perspiration light fastness with a high fixing percent and good build-up property.

DYEING EXAMPLE 6

| Composition of color paste | |
|---|---|
| | Parts |
| Monoazo compounds obtained in Examples 64 to 139 | each 4 |
| Urea | 5 |
| Sodium alginate (5%), thickener | 50 |
| Hot water | 25 |
| Sodium hydrogencarbonate | 2 |
| Balance (water) | 14 |

Using the color paste of the above composition, a manner similar to that of Dyeing Example 5 was repeated, provided that steaming was carried out at 120° C., thereby obtaining a dyed product like in Dyeing Example 5.

DYEING EXAMPLE 7

The monoazo compounds obtained in Examples 1 to 63 each (25 parts) was dissoved in hot water, and the solution was cooled to 25° C. 32.5% Aqueous sodium hydroxide solution (5.5 parts) and 50° Be' water glass were added thereto, and water was added to make the whole 1000 parts at 25° C. to obtain a padding liquor. Immediately thereafter, cotton cloth was padded with the padding liquor and batched up, and the cloth wrapped tightly with a polyethylene film was allowed to stand in a room kept at 20° C.

Above manner was repeated to obtain a padded cotton cloth, which was then wrapped tightly with a polyethylene film, and allowed to stand in a room kept at 5° C.

Both were allowed to stand for 20 hours, and thereafter washed with cool water and then hot water, soaped with a boiling detergent, washed with cool water and then dried.

There was observed almost no difference in their color shade and depth between the dyed products obtained after standing at 5° C. and 20° C. each for 20 hours. In this cold batch-up dyeing method, each monoazo compound was found to have good buid-up property.

DYEING EXAMPLE 8

Using monoazo compounds obtained in Examples 64 to 139, dyeing Example 7 was repeated. Then, results similar to those of Dyeing Example 7 were obtained.

DYEING EXAMPLE 9

The monoazo compounds obtained in Examples 1 to 63 each (25 parts) was dissolved in hot water, and the solution was cooled to 25° C. To this solution were added 32.5% aqueous sodium hydroxide solution (10 parts) and anhydrous sodium sulfate (30 parts), and then water was added thereto to make the whole 1000 parts at 25° C. Immediately thereafter, viscose rayon woven fabric was padded with the obtained padding liquor. The fabric padded was batched-up, wrapped tightly with a polyethylene film, and allowed to stand in a room kept at 20° C.

The above manner was repeated to obtain the fabric padded, which was then batched-up, wrapped with a polyethylene film and then allowed to stand in a room kept at 5° C.

Both were allowed to stand for 20 hours, and thereafter washed with cool water and then hot water, soaped with a boiling detergent, then washed with cool water and dried to obtain each dyed product.

There was observed almost no difference in color shade and depth between the dyed products obtained after standing at 5° C. and 20° C. each for 20 hours.

DYEING EXAMPLE 10

Using the monoazo compounds obtained in Examples 64 to 139, a manner similar to that of Dyeing Example 9 was carried out, then obtaining results similar to those in that Example.

DYEING EXAMPLE 11

Using the monoazo compounds obtained in Examples 1 to 63, dyeing Example 3 was repeated, provided that sodium carbonate was used in an amount of 3 parts in Place of 5 parts, thereby obtaining results similar to those in Dyeing Example 3.

DYEING EXAMPLE 12

Using the monoazo compounds obtained in Examples 1 to 63, dyeing Example 3 was repeated, provided that the dyeing was continued at 50° C. and 70° C., respectively, in place of 60° C., thereby obtaining results similar to those in Dyeing Example 3.

DYEING EXAMPLE 13

Using the monoazo compounds obtained in Examples 1 to 63, dyeing Example 3 was repeated, provided that sodium sulfate was used in an amount of 12 parts in place of 15 parts, thereby obtaining results similar to those in Dyeing Example 3.

DYEING EXAMPLE 14

Using the monoazo compounds obtained in Examples 64 to 139, dyeing Example 4 was repeated, provided that water and sodium sulfate were used in each amount of 150 parts and 23 parts in place of 200 parts and 30 parts, respectively, thereby obtaining results similar to those in Dyeing Example 4.

What is claimed is:

1. A monoazo compound represented by the following formula in a free acid form,

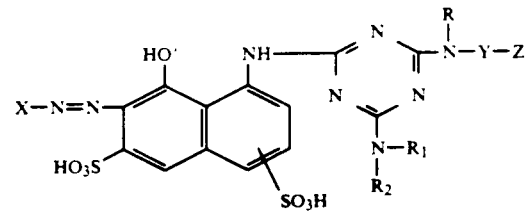

wherein R is hydrogen or $C_1$ to $C_4$ alkyl unsubstituted or substituted with 1 or 2 members selected from hydroxy, cyano, $C_1$ to $C_4$ alkoxy, halogeno, carobxy, carbamoyl, $C_1$ to $C_4$ alkoxycarbonyl, $C_1$ to $C_4$ alkylcarbonyloxy, sulfo and sulfamoyl; X is phenyl unsubstituted or substituted with 1 to 3 members selected from methyl, ethyl, methoxy, ethoxy, halogeno, acetylamino, propionylamino, nitro, sulfo and carboxy, or mono-, di- or tri-sulfonaphthyl; Y is phenylene unsubstituted or substituted with 1 or 2 members selected from methyl, ethyl, methoxy, ethoxy, chloro, bromo and sulfo, or unsubstituted naphthylene or mono-sulfonaphthylene; Z is $-SO_2CH=CH_2$ or $-SO_2CH_2CH_2Z_1$ in which $Z_1$ is a group splittable by the action of an alkali; and $R_1$ and $R_2$ are independently hydrogen, $C_1$ to $C_4$ alkyl, phenyl, naphthyl or benzyl, excepting the case where both $R_1$ and $R_2$ are hydrogen, the alkyl having 1 to 4 carbon atoms and being unsubstituted or substituted with hydroxy, cyano, $C_1$ to $C_4$ alkoxy, amino, halogeno, carboxy, $C_1$ to $C_4$ alkoxycarbonyl, $C_1$ to $C_4$ alkyl-carbonyloxy, carbamoyl, sulfamoyl, sulfo or sulfato, the phenyl being represented by the formula,

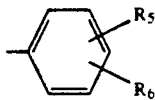

in which $R_7$, $R_8$ and $R_9$ are independently hydrogen, halogeno, $C_1$ to $C_4$ alkyl, $C_1$ to $C_4$ alkoxy, hydroxy, nitro, carboxy or sulfo, the naphthyl being represented by the formula,

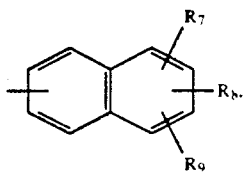

in which $R_7$, $R_8$ and $R_9$ are independently hydrogen, hydroxy or sulfo, and the benzyl being represented by the formula,

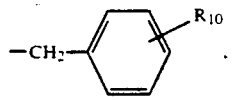

in which $R_{10}$ is hydrogen, methyl, methoxy or chloro; with the proviso that (a) Y is the unsubstituted or substituted phenylene as described hereinabove when X is the unsubstituted or substituted phenyl as described hereinabove, (b) Y is the unsubstituted or mono-sulfonaphthylene when X is the mono-, di- or tri-sulfonaphthyl, and (c)
  (1) $R_1$ is hydrogen and $R_2$ is chlorophenyl, or
  (2) $R_1$ is hydrogen and $R_2$ is the naphthyl excepting sulfonaphthyl, or
  (3) is said alkyl excepting methyl and said sulfo substituted alkyl and $R_2$ is said phenyl excepting sulfophenyl, when R is hydrogen and X and Y are the unsubstituted or substituted phenyl as described hereinabove and the unsubstituted or substituted phenylene as described hereinabove, respectively.

2. A monoazo compound according to claim 1, wherein X is phenyl unsubstituted or substituted with 1 to 3 members selected from methyl, ethyl, methoxy, ethoxy, halogeno, acetylamino, proionylamino, nitro, sulfo and carboxy, and Y is phenylene unsubstituted or substituted with 1 or 2 members selected from methyl, ethyl, methoxy, ethoxy, chloro, bromo and sulfo.

3. A monoazo compound according to claim 2, wherein the monoazo compound is represented by the following formula in a free acid form,

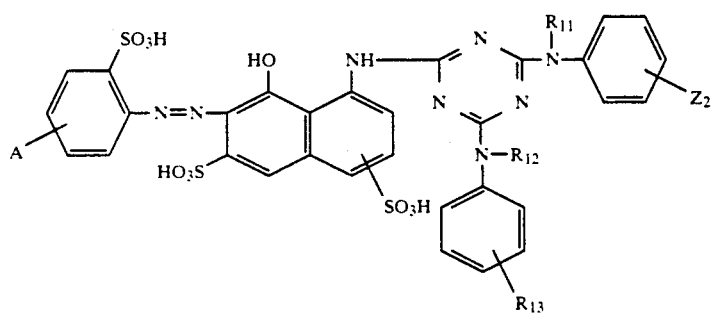

wherein A is hydrogen, methyl, methoxy or sulfo, $R_{11}$ is methyl or ethyl, $R_{12}$ is hydrogen, methyl or ethyl, $R_{13}$ is hydrogen, methyl, ethyl, methoxy, ethoxy, chloro, sulfo or carboxy, and $Z_2$ is —$SO_2CH=CH_2$ or —$SO_2CH_2CH_2OSO_3H$.

4. A monoazo compound according to claim 2, wherein the monoazo compound is represented by the following formula in a free acid form,

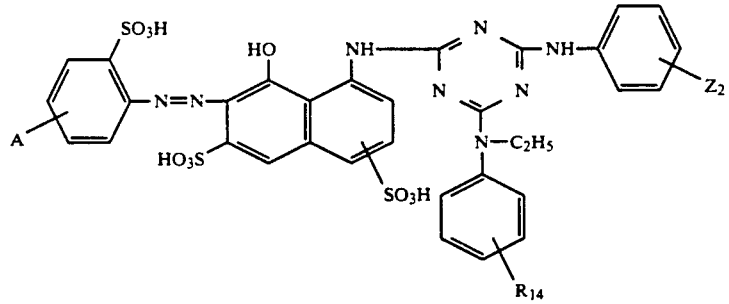

wherein A is hydrogen, methyl, methoxy or sulfo, $R_{14}$ is hydrogen, methyl, ethyl, methoxy, ethoxy or chloro, and $Z_2$ is —$SO_2CH=CH_2$ or —$SO_2CH_2CH_2OSO_3H$.

5. A monoazo compound represented by the following formula in a free acid form,

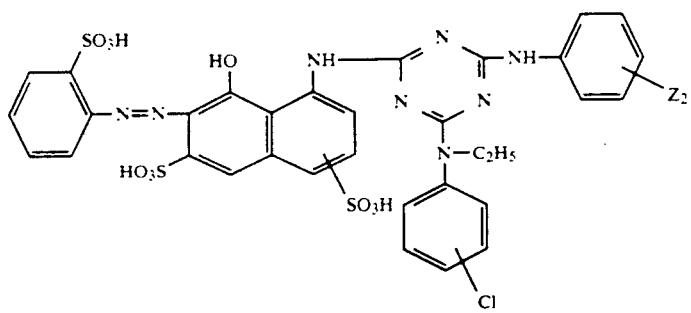

wherein $Z_2$ is $-SO_2CH=CH_2$ or $-SO_2CH_2CH_2OSO_3H$.

6. A monoazo compound represented by the following formula in a free acid form,

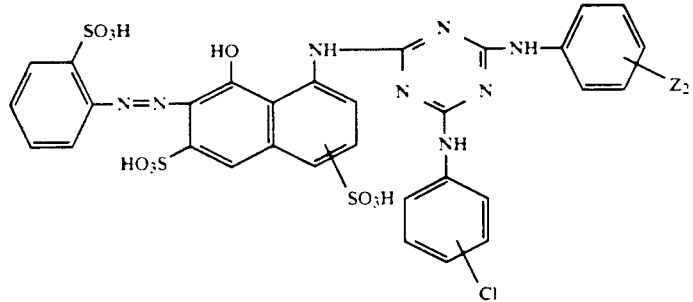

wherein $Z_2$ is $-SO_2CH=CH_2$ or $-SO_2CH_2CH_2OSO_3H$.

7. A monoazo compound according to claim 1, wherein X is mono-, di- or tri-sulfonaphthyl, and Y is unsubstituted or mono-sulfonaphthylene.

8. A monoazo compound according to claim 7, wherein the monoazo compound is represented by the following formula in a free acid form,

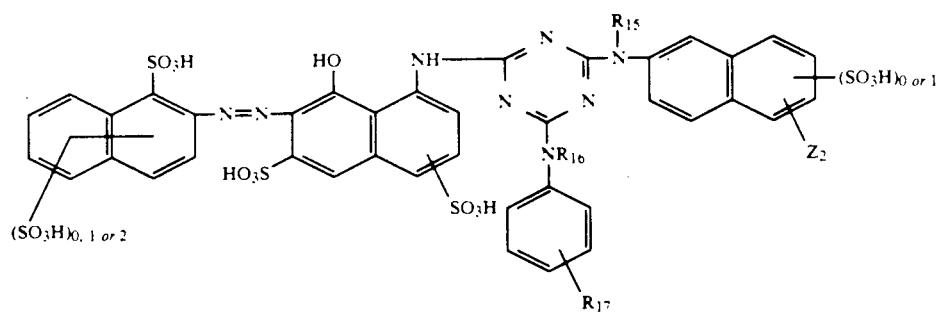

wherein $R_{15}$ and $R_{16}$ are independently hydrogen, methyl or ethyl, $R_{17}$ is hydrogen, methyl, ethyl, methoxy, ethoxy, chloro, sulfo or carboxy, and $Z_2$ is $-SO_2CH=CH_2$ or $-SO_2CH_2CH_2OSO_3H$.

* * * * *